United States Patent Office 3,637,634
Patented Jan. 25, 1972

3,637,634
METHOD FOR NUCLEATING ALPHA-OLEFIN POLYMERS
Paul Joseph Marinaccio, Monroe, Conn., and Joseph Matthew Kelley, Westfield, N.J., assignors to Dart Industries Inc., Los Angeles, Calif.
No Drawing. Filed Mar. 13, 1968, Ser. No. 712,587
Int. Cl. C08f 27/00
U.S. Cl. 260—93.7
4 Claims

ABSTRACT OF THE DISCLOSURE

The nucleation of crystalline polypropylene is accomplished by employment of a masterbatch prepared by dissolving sodium benzoate in water, precipitating the benzoate by addition of an alcohol to form a gel, adding to the gel from 50 to 75% by weight finely divided polypropylene and drying the resulting masterbatch.

BACKGROUND

This invention relates to an improved method and novel compositions for modifying the physical characteristics of crystalline alpha-olefin polymers. More particularly, the invention pertains to a process for the preparation of polypropylene masterbatch containing from about 25 to 50% by weight of a nucleating agent for use in modifying the physical properties of polypropylene resins.

PRIOR ART

It is well known that the crystallite size as well as the percentage of crystallinity influence the properties of crystalline alphaolefin polymers such as polypropylene. In general, commercial processes for the preparation of homo polymer propylene are carried out under conditions which favor the production of crystalline polypropylene by the use of titanium catalysts activated with aluminum alkyl. The polymer produced because of their crystalline content has various desirable physical properties such as stiffness and tensile strength.

Crystalline polypropylene in accordance with this specification means solid polypropylene resins having a high degree, at least 30% and preferably 50%, of crystallinity determined by X-ray analysis or other standard method. In general, polypropylene or polyalpha-olefins having a crystallinity of this order contains at most small portions of material which are extractable in non-aromatic hydrocarbons. Typically, the proportion of highly crystalline polypropylene which is extractable in boiling heptane or isooctane is less than 25% and usually less than 10%. Similarly, "crystallizable" polymers are those which have a molecular arrangement that enables them to solidify from a melt in a highly crystalline structure. The general practice in the art is to refer to "crystalline" or "crystallizable" polymer, rather than "partially crystalline" or "partially crystallizable" polymer, even though olefin polymers of 100 percent crystal structure are not known to exist. For example, a crystallinity of 70% is extremely high for polypropylene.

Normally solid, crystalline polypropylene usually has a viscosity average molecular weight of at least about 40,000 and generally between 100,000 and 1,200,000. For convenience the molecular weight is usually expressed in terms of intrinsic viscosity. The intrinsic viscosity of polypropylene, measured in decalin at 150° C. is generally between 1.0 and 6 dl/g. but may be as low as 0.5 or less and as high as 10 or more.

A serious commercial disadvantage of crystalline polypropylene which will be referred to for the purpose of this discussion is the lack of clarity or transparency which shows up as haze in thin films and as translucency, decreasing to ultimate opacity, in polypropylene articles of increased thickness. Studies have revealed that polypropylene crystallizes from a melt in a form in which the individual crystals are present in spheroid or ellipsoid bodies, known as spherulities, and that clarity or transparency are markedly improved when the spherulities are relatively small. Therefore, it has been proposed to add a variety of materials to polypropylene in order to control the rate of growth and therefore the size of the crystallities or spherulities. By modifying the crystallization process, that is, by nucleation of the polymers in such a manner significant improvements are realized in physical properties such as clarity, transparency, stiffness, hardness and density in some cases.

Alkali metal benzoates, and particularly sodium benzoate have been suggested heretofore as additives for modifying the crystallization process of crystalline alpha-olefin polymers. For most purposes, minute amounts of alkali metal benzoates have been very effective in modifying the crystallization process and the crystal structure of polypropylene. Unfortunately the use of commercially available forms of alkali metal benzoates as well as other nucleating agents have the disadvantage of producing polypropylene containing noticeable amounts of non-dispersed additive. This undesirable result is attributed to the limited solubility of most of the more effective nucleating agents and to the unfavorable particle size distribution of their commercial forms.

SUMMARY OF THE INVENTION

One object of the present invention is to provide an improved method for modifying the physical properties of crystalline alpha-olefin polymers.

Another object of the present invention is to provide a process for improving the clarity of translucency characteristics of polypropylene with nucleating agents while avoiding the difficulties previously encountered in the use of such additives.

A further object of the present invention is to provide a process for the preparation of a masterbatch of a crystalline alpha-olefin polymer containing a nucleating agent dispersed therein.

A still further object of the present invention is to provide a method of enhancing the clarity or translucency of articles made from polypropylene having its crystallization process controlled by the presence of a minor amount of an alkali metal benzoate.

These and other objects of the present invention will become readily apparent from the ensuing description and illustrative embodiments.

In accordance with the present invention it has now been found that the dispersion problems associated with the use of nucleating agents for modifying the physical properties of crystalline alpha-olefin polymer can be readily overcome by preparing an alpha-olefin polymer masterbatch containing sodium benzoate as the nucleating agent under carefully controlled conditions.

The novel compositions and process of this invention applies to nucleation of crystalline alpha-olefin polymers and copolymers and specifically to those compositions which have at least about thirty percent (30%) crystallinity. Crystalline polypropylene and copolymers thereof are of particular interest and emphasis will be placed on such polymers. The properties of importance which are benefited by a nucleating agent are increased clarity for thin films, stiffness (for copolymers also), hardness and density.

The polypropylene masterbatch of this invention is generally prepared by dissolving sodium benzoate in water, combining the sodium benzoate solution with excess alcohol to form a gel-like slurry, admixing polypropylene powder or particles and said slurry with agitation to ensure thorough mixing, separating the solids from the resulting polypropylene-containing slurry by filtration, centrifugation, or the like, drying the filter cake at an elevated temperature, and recovering polypropylene powder or particles containing finely divided sodium benzoate. The thus produced polypropylene masterbatch will generally contain the nucleating agent (sodium benzoate) in an amount ranging from 5 to 75%, usually from about 25 to 50% by weight, and perferably about 30 to 40% by weight, based on the total weight of the masterbatch composition.

All of the above sequential operating steps, with the exception of the drying step, are carried out under ambient temperature and pressure conditions. If desired, elevated temperatures of from about 30° to 100° C. may be employed. In the drying step the temperatures will range from about 20° to 60° C. It is also preferred to effect drying under vacuum conditions or where the pressure is reduced to at least 15 inches of Hg.

Advantageously, the amount of sodium benzoate dissolved in water should be sufficient to give a concentration just below the saturation point, i.e., approximately 61 grams per 100 grams of water at 25° C. It will be understood, however, that lower concentrations of sodium benzoate can also be effectively employed. Thus saturation can be considered as 100 percent concentration in this case and in general concentrations of the nucleating agent of from 10 to 90% plus are required.

The alcohol used in forming the gel-like slurry is an alaknol having from about 1 to 10 carbon atoms per molecule such as methanol, ethanol, isopropanol, propanol, pentanol, hexanol, and the like as well as mixtures thereof. Preferred alcohols include isopropanol and methanol. The essential characteristics of the alcohol employed in this dispersion step is that it be easily removed during drying, that is, it has a high vapor pressure. The amount of alcohol may vary over a wide range, 10 to 200 times the volume of the aqueous solution, and the exact amount of alcohol employed is not a critical feature of this invention. In general, however, a sufficient amount of alcohol is present in the slurry to permit thorough and complete mixing of the materials present in the composition when subjected to agitation. If necessary, additional alcohol can be added to the admixture during agitation to ensure an adequate dispersion of sodium benzate in the polypropylene.

Although alcohol has been specified above as the preferred component, other non-solvents for sodium benzoate can be used such as oxygenated organic compounds of which ketones (acetone), esters, or partial esters, glycols such as ethylene glycol and aldehyde are representative. In the process of this invention water is required as the solvent for the nucleating agent and an oxygenated organic compound such as an alcohol as the non-solvent. The other requirement to be met in accordance with this invention is that the water must be partially but preferably substantially completely miscible with the alcohol.

In the process of this invention it is the above prerequisites that result in the formation of the gel when alcohol is added to the water containing sodium benzoate dissolved therein. The sodium benzoatein the "precipitated" form in the gel is of very fine particle size probably approaching colloidal form. In this form the sodium benzoate can readily be incorporated into the particular polyolefin in question, that is, it promotes solubility in the polymer thereby becoming extremely effective in its function as a nucleating agent.

As heretofore indicated, the crystalline alpha-olefin polymers and copolymers can be treated with the sodium benzoate nucleating agent in amounts of from 0.05 to 2.0 percent by weight preferably 0.1 to 1.0 percent by weight in order to realize the benefits of the incorporated additives. The polymers which can be treated include those of ethylene, 4-methylpentene-1, butene-1, 3-methylbutene-1, pentene-1 and similar. Block copolymers of various alpha-olefins and ethylene can be particularly benefited (stiffness increase) by the nucleating agents herein.

Conventional equipment and procedures can be utilized for accomplishing the mixing of the polypropylene powder or particles with the aqueous, gel-like slurry. Illustrative equipment includes Ball Mill, Waring Blendor and various mixers. In general the blades or paddles will be rotated at a rate of from about 5 to 200 r.p.m., although the rate or degree of agitation is not critical provided that complete dispersion is attained. Agitation may either be commenced prior to, during or following the addition of the polypropylene powder or particles to the gel-like slurry containing water, alcohol and sodium benzoate. As previously discussed, the amount of polypropylene added will be sufficient to give a final masterbatch composition containing about 25 to 50%, preferably about 30 to 40%, sodium benzoate with the remainder being polypropylene. It is also possible to prepare polypropylene masterbatches (or masterbatches of other olefin polymers) according to above described process which contain other conventional polypropylene additives in addition to the sodium benzoate. Such other additives include, for example, antioxidants, stabilizers against ultraviolet radiation, fillers, slip agents, antistats, and the like as well as mixtures thereof.

After the addition of polypropylene and agitation has been completed, the resulting polypropylene-containing slurry is treated to separate solids therefrom. Conventional solids separating equipment and techniques can be employed in this step. For example, drum filters, centrifuges, etc. to separate the solids from the mother liquor. For most purposes, centrifugation has proven to be the preferred procedure for commercial operations.

The resulting solids comprising polypropylene and sodium benzoate are then dried at elevated temperatures to remove residual water and alcohol, if present. As previously discussed, the drying is preferably carried out under vacuum conditions and at a temperature ranging from 30° to 60° C. The drying step may either take place in the centrifuge or other separatory equipment or after the solids have been removed therefrom.

The polypropylene or other olefin polymers employed in the above described process are those produced by polymerizing in the presence of stereospecific catalyst systems. Such processes and catalysts, generally transition metal halides such as titanium trichloride activated with aluminum alkyls.

The process for preparing the polypropylene-alkali metal benzoate masterbatch will be more fully understood by reference to the following illustrative embodiment.

EXAMPLE 1

A sodium benzoate masterbatch was prepared by charging a vessel with 150 gallons of isopropyl alcohol and adding to the alcohol three gallons of a saturated solution of sodium benzoate in water (2.08 gallons of water containing 10.58 pounds of sodium benzoate). The addition of the solution of sodium benzoate was carried out at room temperature (about 25° C.) and was mixed. The result was a gel-like slurry. Following this (still at room temperature) there was added with admixing 10.58 pounds of polypropylene powder having the following particle size distribution:

| Mesh size: | Weight, percent |
|---|---|
| 20 | 7.4 |
| 40 | 20 |
| 60 | 17.3 |
| 80 | 9.3 |
| 120 | 12.3 |
| Fines | 33.7 |

The resulting powder-gel slurry was agitated to insure a good and thorough dispersion (the above procedure results in a 50 percent masterbatch of sodium benzoate and polypropylene). After the thorough mixing step above, the mixture was centrifuged and the cake was dried at 150° F. under vacuum of about 30 inches of mercury.

As noted hereinabove and before, it is necessary, in order to obtain a good distribution of the very fine particle size sodium benzoate to employ a finely divided polyolefin powder. Usually as a general rule, the finer the particle size, the better, and a preferred size is an average of around 200 mesh (50% above and 50% below) and lower (particle size is defined by ASTM D-1921-63 and is entitled "Particle Size (Sieve Analysis) of Plastic Materials").

EXAMPLE 2

Following the procedure above, another batch of nucleating agent polyolefin concentrate was prepared by adding 7.6 pounds of sodium benzoate to one and one half gallons of water and then adding this solution to seventy-five (75) gallons of isopropyl alcohol to obtain a gel as before of precipitated sodium benzoate with occluded and entrapped water and alcohol, the sodium benzoate being in finely divided form. This form is stable at ambient temperatures and the salt does not readily settle out. The resulting gel was then processed as above to prepare a masterbatch by adding enough polypropylene powder to form a 50% masterbatch.

The above data show that a novel polypropylene masterbatch composition of matter containing substantial quantities of an alkali metal benzoate can be readily prepared by the described process.

In accordance with another feature of this invention portions of the above-described polypropylene masterbatch are employed for introducing the alkali metal benzoate additive into polypropylene polymers. For most commercial applications the polypropylene employed in the preparation of the masterbatch will be the same as polymer to which the masterbatch is added. However, the polypropylene polymers may also be different, since only minor amounts of the masterbatch need to be added in order to achieve the desired modification of physical properties. Thus any polymer compatible with polypropylene will be useful as a masterbatch component for example, copolymers of propylene with other olefins (block or random), polyethylene, polybutene, poly-4-methyl pentene-1 and similar. In general, the amount of polypropylene masterbatch employed assuming a 50% masterbatch will range from about 0.05 to 2.0%, and preferably from about 0.1 to 1.0% by weight based on the weight of the polypropylene polymer to which it is added. The amount of nucleating agent needed for the various crystalline polymers is from 0.05 to 0.2% by weight or higher, for example 1 percent.

Various methods can be employed for introducing the masterbatch of this invention into the crystalline polymers. It is possible, for example, to add the masterbatch to a dry polypropylene polymer either when the polymer is in the form of a powder fluff or in the form of shaped pellets or the like. Alternatively, the masterbatch can be added to the crystallizable polypropylene polymer after the latter has been melted.

In order to obtain desired improvements in physical properties it is essential that a substantially homogeneous distribution of the masterbatch in the molten polypropylene polymer be obtained prior to the final crystallization of the polymer. Mixing of the masterbatch and the polymer is best carried out by applying mechanical mixing at temperatures at which the polymer has a relatively low viscosity, i.e., a temperature exceeding the melting temperature of the polymer by from 20° to 150° C. These conditions are particularly important when products of greatly enhanced clarity or transparency are desired.

As a result of the treatment with the masterbatch, the molten polymer can be cooled rapidly or over a relatively long period of time to give a solid polymer product having a high degree of crystallinity and a fine spherulite structure.

Cooling of the polymer can take place in any suitable apparatus. Cooling is usually carried out in conventional apparatus associated with the production of shaped articles from olefin polymers.

The manner in which mixing takes place provides a uniform distribution of the crystallization promoting additive in the polymer. This uniform distribution remains substantially unaffected during the crystallization, both when crystallization progresses very rapidly and when there is a considerable temperature gradient, as in the cooling of large objects.

Shaped articles from product according to this invention may be, for example, bars, sheets, films, tapes, granules, rods or flakes, molded or extruded large or small shapes or filament. Shaped articles according to this invention may be manufactured from the mixtures according to this invention by casting, compression molding or injection molding; films may be obtained by blowing or by slit extrusion; filaments, bars, tapes and the like, may be obtained by extrusion. If desired, these can be reduced by chopping, to the form of granules, chips or the like. Filaments can be stretched to obtain further improvement of properties.

This aspect of the present invention will be illustrated more completely in the following embodiment.

EXAMPLE 3

Using the masterbatch prepared as in Example 1 an injection molding polypropylene (melt index 10) containing from 2 to 3 percent ethylene as a random copolymer was nucleated by blending (melt) with sufficient masterbatch to result in a polypropylene containing 0.05 percent by weight sodium benzoate. The treated polymer had increased stiffness in comparison to the untreated material.

In a similar manner to the above, a film grade propylene homopolymer having a melt index of about 5 and a boiling heptane insoluble content of about 95, was treated to obtain a product containing 0.05 percent sodium benzoate. Excellent results were obtained via clarity and transparency due to the nucleation effect of the additive.

While particular embodiments of this invention are shown above, it will be understood that the invention is obviously subject to variations and modifications without departing from its broader aspects.

What is claimed is:

1. A process for preparing a composition of alpha-olefin polymer particles and alkali metal benzoate as a nucleating agent which comprises:

(A) dissolving alkali metal benzoate in water to obtain a solution thereof, (B) admixing said solution with an excess amount of an alkanol having from 1 to 10 carbon atoms to precipitate the alkali metal benzoate and form a gel-like slurry, (C) adding solid alpha-olefin polymer particles to said slurry and agitating to disperse said polymer particles in said slurry, (D) separating the solids from the slurry and drying the solids to a temperature of 30° C. to 100° C. to thereby recover the composition.

2. A process according to claim 1 wherein the concentration of alkali metal benzoate in the solution is in the range of from 10% to 100% of saturation.

3. A process according to claim 1 wherein the recovered composition contains from 5% to 75%, by weight, of alkali metal benzoate.

4. A process according to claim 1 wherein the alpha-olefin polymer is polypropylene and the alkali metal benzoate is sodium benzoate.

References Cited

UNITED STATES PATENTS

| | | | |
|---|---|---|---|
| 2,984,634 | 5/1961 | Caldwell et al. | 260—23 |
| 3,322,739 | 5/1967 | Hagemeyer et al. | 260—88.2 |
| 3,327,020 | 6/1967 | Binsbergen | 260—878 |
| 3,332,906 | 7/1967 | Aboulafia | 260—41 |
| 3,367,926 | 2/1968 | Voecks | 260—93.5 |

JOSEPH L. SCHOFER, Primary Examiner

S. M. LEVIN, Assistant Examiner

U.S. Cl. X.R.

260—88.2 S, 94.9 GD, 878 B